(12) United States Patent
Jaeschke et al.

(10) Patent No.: US 9,494,016 B2
(45) Date of Patent: Nov. 15, 2016

(54) COLLECTING TANK, SYSTEM COMPRISING COLLECTING TANK AND MULTI-PHASE PUMPS, AND METHOD FOR SEPARATING AND DIVIDING UP A MULTI-PHASE MIXTURE

(75) Inventors: Axel Jaeschke, Minden (DE); Gerhard Rohlfing, Hille (DE);
(Continued)

(73) Assignee: ITT Bornemann GmbH, Obernkirchen (DE)

( * ) Notice: Subject to any disclaimer, the term of this patent is extended or adjusted under 35 U.S.C. 154(b) by 707 days.

(21) Appl. No.: 13/695,128

(22) PCT Filed: Apr. 27, 2011

(86) PCT No.: PCT/DE2011/000457
§ 371 (c)(1),
(2), (4) Date: Mar. 25, 2013

(87) PCT Pub. No.: WO2011/137892
PCT Pub. Date: Nov. 10, 2011

(65) Prior Publication Data
US 2013/0233390 A1      Sep. 12, 2013

(30) Foreign Application Priority Data
May 3, 2010   (DE) .................. 10 2010 019 238

(51) Int. Cl.
*E21B 41/00* (2006.01)
*E21B 43/00* (2006.01)
(Continued)

(52) U.S. Cl.
CPC ............. *E21B 41/00* (2013.01); *E21B 43/00* (2013.01); *F04B 43/00* (2013.01); *F17D 3/00* (2013.01);
(Continued)

(58) Field of Classification Search
CPC ............ E21B 41/00; E21B 43/00; F17D 3/00; F04B 43/00; Y10T 137/85986; Y10T 137/0318; Y10T 137/86035
(Continued)

(56) References Cited

U.S. PATENT DOCUMENTS 4,574,827 A * 3/1986 Konak .................... F16L 41/02
                                                      137/599.01
5,035,842 A   7/1991 Mohn
(Continued)

FOREIGN PATENT DOCUMENTS

DE       88 10 901 U1      10/1988
DE       69305301          4/1997
(Continued)

*Primary Examiner* — Mary McManmon
*Assistant Examiner* — Nicole Wentlandt
(74) *Attorney, Agent, or Firm* — Whitham, Curtis & Cook, P.C.

(57) ABSTRACT

The invention relates to a collecting tank for multi-phase mixtures from a hydrocarbon source, having at least one inlet (20) for introducing multi-phase mixtures into the collecting tank (10), and having a plurality of outlet connectors (30), which can be connected to pumps (3) via which multi-phase mixtures are pumped, the outlet connectors (30) being assigned inwardly directed internals (40) which project upwards beyond the collecting-tank base (11) and have a first, upper opening (42) and a second, lower opening (41), wherein the flow cross section of the lower opening (41) is smaller than that of the upper opening (42).

12 Claims, 11 Drawing Sheets

(75) Inventors: Jens-Uwe Brandt, Rinteln (DE);
Marco Bredemeier geb Drewniok, Niedernwöhren (DE); Mark Reichwage, Obernkirchen (DE)

(51) Int. Cl.
*F04B 43/00* (2006.01)
*F17D 3/00* (2006.01)

(52) U.S. Cl.
CPC ... *Y10T 137/0318* (2015.04); *Y10T 137/85986* (2015.04); *Y10T 137/86035* (2015.04)

(58) Field of Classification Search
USPC ............................. 137/172, 545.26; 210/513
See application file for complete search history.

(56) References Cited

U.S. PATENT DOCUMENTS

| | | | |
|---|---|---|---|
| 5,176,174 A | | 1/1993 | Toraason et al. |
| 5,375,618 A | | 12/1994 | Giannesini |
| 5,421,357 A | | 6/1995 | Levallois |
| 5,494,067 A | | 2/1996 | Levallois |
| 7,273,513 B2 | * | 9/2007 | Linga ..................... B01D 3/06 261/DIG. 54 |

FOREIGN PATENT DOCUMENTS

| | | |
|---|---|---|
| EP | 0 339 187 | 11/1989 |
| GB | 2 000 688 | 1/1979 |
| RU | 2160866 C1 | 12/2000 |
| RU | 2007131473 A | 2/2009 |

* cited by examiner

COLLECTING TANK, SYSTEM COMPRISING COLLECTING TANK AND MULTI-PHASE PUMPS, AND METHOD FOR SEPARATING AND DIVIDING UP A MULTI-PHASE MIXTURE

FIELD OF THE INVENTION

The invention relates to a collecting container for multi-phase mixtures from a hydrocarbon source, having at least one inlet for introducing multi-phase mixtures into the collecting container, to a system comprising at least one collecting container and a plurality of multi-phase pumps connected thereto, and to a method for separating and dividing up a multi-phase mixture among a plurality of multi-phase pumps.

BACKGROUND

When extracting multi-phase mixtures, in particular of hydrocarbons, the extraction conditions fluctuate. Hydrocarbons are generally extracted in mixtures, in which different aggregate states are present. In addition to a solid phase, for example sand, liquid phases and gas phases are present. These phases are present in different proportions, wherein the composition of the multi-phase mixtures varies within a wide range so that it is impossible to predict when, and for how long, each composition of the multi-phase mixture will be extracted. Therefore, it may be that, after a relatively long period of extraction with a predominantly liquid phase fraction, a gas phase fraction is extracted for a long period, sometimes until gas phases are extracted exclusively. The moment at which the fractions of a multi-phase mixture will be extracted, as well as the duration of said extraction and the ratio of said proportions, are thus unknown, which hinders the extraction process.

The capital outlay when developing hydrocarbon sources is extraordinarily high. In so doing, it may be necessary to provide a plurality of delivery pumps, for example if the volumes to be conveyed cannot be transported expediently using a particular pump size, for example because the required pump sizes are not available, or because the sizes adapted to the demand are not expedient from a technical or economical point of view.

Young production fields only develop their maximum production after a few years, and therefore there is the problem that a relatively small pump size may be sufficient when extraction is begun, which can lead to problems over the course of further operation however when the pump size suitable at the start is no longer sufficient. There is thus the possibility of operating a plurality of pump units, which are arranged in parallel, so as to provide variability of the delivery rate in addition to a desired redundancy and fail-safe operation. From a logistical point of view, it may be expedient to establish just one pump size and to satisfy the different production demand by means of a different number of parallel multi-phase pumps or by means of a corresponding adaptation of production to the individual multi-phase pumps.

Redundant arrangements of multi-phase pumps reduce the risk of failure, in particular the risk of total failure. In the normal case, the use of speed-variable multi-phase pumps allows wear-reducing operation at reduced speed with a corresponding design, whilst, in the event of failure of a pump, the remaining assembly or the remaining assemblies can largely compensate for the production failure with an increased operating speed.

As mentioned above, when extracting hydrocarbons, the multi-phase mixtures consist of different substances in different aggregate states, for example water, possibly with sand additions, gas condensates, crude oil, natural gas or associated petroleum gas, which have specific weights, which deviate from one another. If multi-phase mixtures are to be divided up among a plurality of multi-phase pumps, there is the problem of ensuring uniform division, since the heavy substances such as liquids preferably fall into exits arranged at the bottom and preferably flow past exits arranged to the side. In the case of branchings, there is thus the problem that a uniform division of the extracted components has to be ensured so as to thus prevent an increased temperature load for pumps charged predominantly with gas fractions.

One possibility for achieving a uniform division of the delivery of the product flow lies in a horizontally, strictly symmetrical arrangement of the distribution points. This has the disadvantage of a high spatial requirement, high weight and associated high costs, and a $2^x$ number of pumps must also always be provided so as to achieve a uniform division. The failure of a pump, arrangement of different pump types, the disconnection of individual pumps or other interruptions leads to non-uniform distributions, which may lead to overloading of individual multi-phase pumps.

SUMMARY

The object of the present invention is to ensure the most uniform and long-lasting supply possible of multi-phase pumps with a sufficient liquid volume so as to reduce the temperature load, even during long periods of gas phase extraction.

In accordance with the invention, this object is achieved by a collecting container having the features in the main claim, a system having the features in the second independent claim, and a method having the features of the third independent claim. Advantageous embodiments and developments of the invention are presented in the dependent claims, the description and in the figures.

In the case of the collecting container according to the invention for multi-phase mixtures from a hydrocarbon source, having at least one inlet for introducing multi-phase mixtures into the collecting container and a plurality of outlet connectors, which can be connected to pumps, via which multi-phase mixtures are pumped, the outlet connectors are assigned inwardly directed internals which project upwardly beyond the collecting container base and have a first, upper opening and a second, lower opening, wherein the flow cross section of the lower opening is smaller than that of the upper opening. As a result of the internals provided in the collecting container, the different properties in terms of the specific weight of the liquid phase and of the gas phase, in particular of crude petroleum and natural gas, are utilized so that a metering effect and a desired product distribution are achieved. The gas phase can flow through the upper opening relatively unhindered, whilst the liquid phase settling at the base of the collecting container is collected and conveyed through the relatively small, lower opening, only slowly, to the pumps, which transport away the multi-phase mixtures. A common inlet or a number of inlets is/are provided, so that the multi-phase mixture can flow into the collecting container. The multi-phase mixture can flow directly from the bore hole into the collecting container for example. A gravity-induced separation of the gas phase and of the liquid phase takes place in the collecting container. The liquid phase settles at the base of the collecting container, whilst the gas phase distributes above the liquid phase within the collecting container. The gas phase can be conveyed unhindered through the upper, large opening to the individual pumps, which are connected at their inlet side to the collecting container. Likewise, the liquid phase flows unhindered through the upper opening, provided the fill level within the collecting container is high enough, so as to reach the upper opening. A sump, which is filled with liquid phase and possibly solid fractions, forms beneath the upper opening. The sump is drained through the second, lower opening in the internals, which is preferably arranged at the collecting container base or just above the collecting container base. The liquid phase can thus drain from the collecting container through the lower opening and reaches the respective pump, which is connected to the outlet connector. It is thus ensured that liquid phase is discharged uniformly from the collecting container through the respective outlet connectors to the respective pumps over a long period, that is to say until the liquid sump has been emptied. As a result of the provision of the minimal required liquid volume over a long period, it is ensured that thermal stability of the pumps connected to the outlet connectors is ensured, even during the extraction exclusively of the gas phase through the inlet pipe. The compression heat, for the gas phase, generated within the pump is primarily transported away via the liquid phase supplied to the pumps. In the pumps, which are designed as screw-type pumps for example, the gaps present between the screw spindles are also lubricated and sealed. The temperature stability, tightness of the screw spindles with respect to a push-back of the extracted product and the service life of the pumps are thus increased.

The outlet connector or the outlet connectors is/are preferably oriented downwardly in an inclined manner or vertically upwardly. The transporting away of the liquid phase through the outlet connectors is thus facilitated. In addition, the internals can be arranged at, or in, the outlet connectors so that the lower openings in the internals can thus be assigned easily to the respective outlet connectors and therefore to the respective outlet channels and the pumps connected thereto.

The collecting container may preferably be designed as a collecting pipe or collecting tank, although alternative embodiments of the collecting container are possible.

Due to the arrangement of the internals such that the upper opening thereof is oriented vertically upwardly, it is basically ensured that only liquid phase above the level of the opening can pass through the upper, large opening.

So as to change the fluid flow through the lower opening, said lower opening can be assigned an adjustable throttle device or closure device, via which the flow cross section can be reduced or the opening can be closed. In principle, it is also possible for the upper opening to have a throttle device or closure device so as to block certain outlets or to influence the flow behavior in a desired manner.

The internals can be mounted displaceably and/or rotatably in the collecting container so as to adapt to different requirements. A displaceable mounting of the internals may lead to a reduction or increase in the liquid level; the same is true of a rotatable embodiment of the internals in the collecting container. With an inclined arrangement of the internals, the level or the cross section of the lower opening for example can be changed as a result of rotation; the same is true of a displaceable arrangement of the internals within the collecting container.

The internals can be designed as inserts, for example basket-like adjustable inserts, or as hollow sections, baffle plates or deflector plates so as to achieve a formation of a liquid sump in the collecting container and controlled discharge through an opening within the internals in the vicinity of the collecting container base.

The internals can be assigned adjustment devices, via which the free flow cross section of the upper and/or lower opening in the internals can be varied from outside the collecting container. As a result of this adjustment device, it is possible to change the parameters during operation of a delivery device, for example so as to disconnect individual pumps, supply greater volumes of liquid phase or to reduce the volume of supplied liquid phase.

The collecting container is preferably designed in a closed manner so as to use the internal pressure to assist the extraction process. Pressure relief valves can be arranged so as to prevent failure of the container structure in the event that a maximum pressure is exceeded.

Shut-off devices may be arranged on the internals, outlet connectors and/or outlet pipelines so as to shut off individual pumps, which are arranged downstream of the collecting container. These pumps can thus be serviced without difficulty. It is likewise possible to adapt the delivery rate to the desired production by shutting off individual delivery pumps.

Separation devices can be arranged in the collecting container and separate the gas phase from the liquid phase. These separation devices may be diverting devices, labyrinths, separators or flow obstacles. The separation device may likewise be formed by an expansion of the flow cross section so as to facilitate gravity-induced separation. Flow rates of at most 0.5 m per second are preferably achieved in the collecting container and corresponding devices for maintaining this flow rate of the multi-phase mixture can be provided, for example throttles or the like. The maximum rate can be adjusted by limiting the flow rate on the inlet side of the storage container. So as to maintain this flow rate, the collecting container is to be dimensioned so as to be accordingly large.

The outlet lines, which lead from the outlet connectors to the pumps, in particular multi-phase pumps, are dimensioned in such a way that relatively high flow rates of at least 3 m per second prevail, so as to prevent separation within the pipeline.

The system according to the invention comprising a collecting container and a plurality of multi-phase pumps connected thereto enables parallel operation with high material flows with use of standardized sizes of the connected multi-phase pumps and variability in the production. As a result of redundant pumps, which are not operated at their output limits, the availability of the system as a whole can be maximized, since, if a pump connected in parallel fails, the failure can be assumed by the other pumps.

In addition to the direct conveyance through the pumps connected in parallel on the outlet side, it is possible for at least one inlet multi-phase pump to be arranged on the inlet side of the collecting container, wherein a line from the collecting container to the inlet side of the inlet multi-phase pump is laid from at least one connector so as to enable recirculation of a liquid phase on the inlet side of the pump. The thermal stability of the inlet multi-phase pump can thus be increased.

A control device can be provided, which is coupled to sensors and adjustment devices arranged on the multi-phase pumps and adjusts the flow cross section of the lower opening on the basis of the sensor values. For example, if excessively high temperatures are determined at individual multi-phase pumps, an increased liquid proportion can be supplied to the multi-phase mixture to be conveyed by increasing the flow cross section of the lower opening so as to remove thermal energy accumulating within the multi-phase pumps from the pump system. Alternatively or simultaneously, the gas fraction can be reduced so as to reduce the volume of newly generated compression heat.

In accordance with the method for separating and dividing up a multi-phase mixture among a plurality of multi-phase pumps, the multi-phase mixture is conveyed into a collecting container and is separated by means of separation devices, wherein the separated liquid phase is supplied in a metered manner to individual multi-phase pumps. The collecting container may be formed as a separate collecting container, into which multi-phase mixtures are introduced directly from a source. Alternatively, the multi-phase mixture is introduced from one pump into a separate collecting container and is then pumped off via further pumps, and lastly it is possible for the collecting container to be designed as part of a multi-phase pump and for separated liquid phase to then be supplied from this collecting container to other pumps in a metered manner. It is thus possible, via transverse connections of pumps arranged in parallel, to ensure a minimal supply of liquid phase if sufficient liquid phase is collected within one or more pumps and is then conveyed in a controlled manner to other pumps, which deliver a smaller liquid fraction. The liquid fraction to be delivered can be established via sensors so that the supply of the separated liquid phase from the delivery side of the pump to the intake side of the requesting pump is regulated on the basis of sensor data, which include the temperature, the gas or liquid volumes, pressures and the like for example.

The multi-phase mixture can be separated in the collecting container by reducing the flow rate of the inflowing multi-phase mixture, for example by increasing the flow cross section. Gravity-induced separation of liquid phase and gas phase thus takes place.

Separated liquid phase can be supplied to a pump on the inlet side arranged before the collecting container in the direction of conveyance so that recirculation takes place. The volume of the supplied liquid phase can be set in accordance with sensor parameters, for example on the basis of the delivered liquid phase or on the basis of temperature values.

BRIEF DESCRIPTION OF THE DRAWINGS

Exemplary embodiments of the invention will be explained hereinafter in greater detail on the basis of the figures, in which.

DETAILED DESCRIPTION

Figure 1:
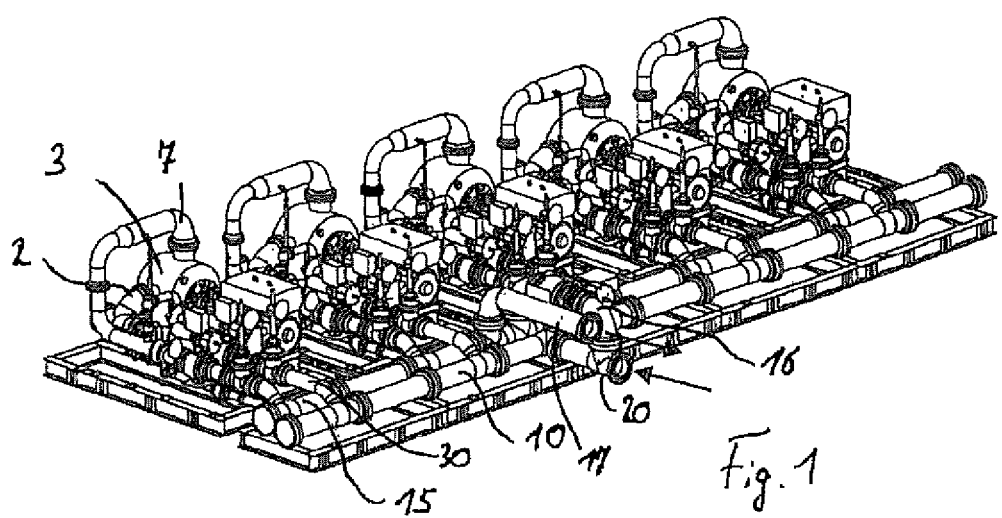
FIG. 1 shows an overview of an extraction facility.

An extraction facility for multi-phase mixtures comprising a plurality of multi-phase pumps 3 arranged in parallel is illustrated in FIG. 1, said pumps each being arranged on a base. The multi-phase pumps 3 have an inlet 2 and an outlet 7. A line leads from the outlet 7 to a collecting container 15, from which the collected mixture, which is collected by the multi-phase pumps 3, which are generally designed as screw-type pumps, and is discharged through an outlet 17. The inlet side 2 of the multi-phase pumps 3 is connected to outlet channels 30 of a collecting container 10. This collecting container 10 has an inlet 20, through which the multi-phase mixture, generally a mixture of water, sand, petroleum oil, natural gas and associated gases, passes. The inlet 20 may lead directly to a borehole, and a pump device may be arranged upstream of the inlet if necessary. Should the multi-phase mixture not require pumping due to its natural pressure, a bypass 16 is provided, which directly connects the inlet 20 to the outlet collecting container 15.

Internals are arranged in the collecting container 10 and are assigned to the respective connectors with outlet channels 30, via which a metered liquid supply to the individual pumps 3 is ensured. The collecting container 10, also referred to as an inlet header, collects the multi-phase mixture originating from the source and distributes it uniformly among the individual multi-phase pumps 3. In the exemplary embodiment illustrated, the inlet collecting container 10 is aligned substantially horizontally and is designed as a pipe so that gravity-induced separation of the individual components of the multi-phase mixture takes place. The heavier fractions, that is to say solids and liquid phases, are collected on the base of the collecting container 10, whereas the lighter components collect above the liquid phase and the solid phase.

Figure 2:
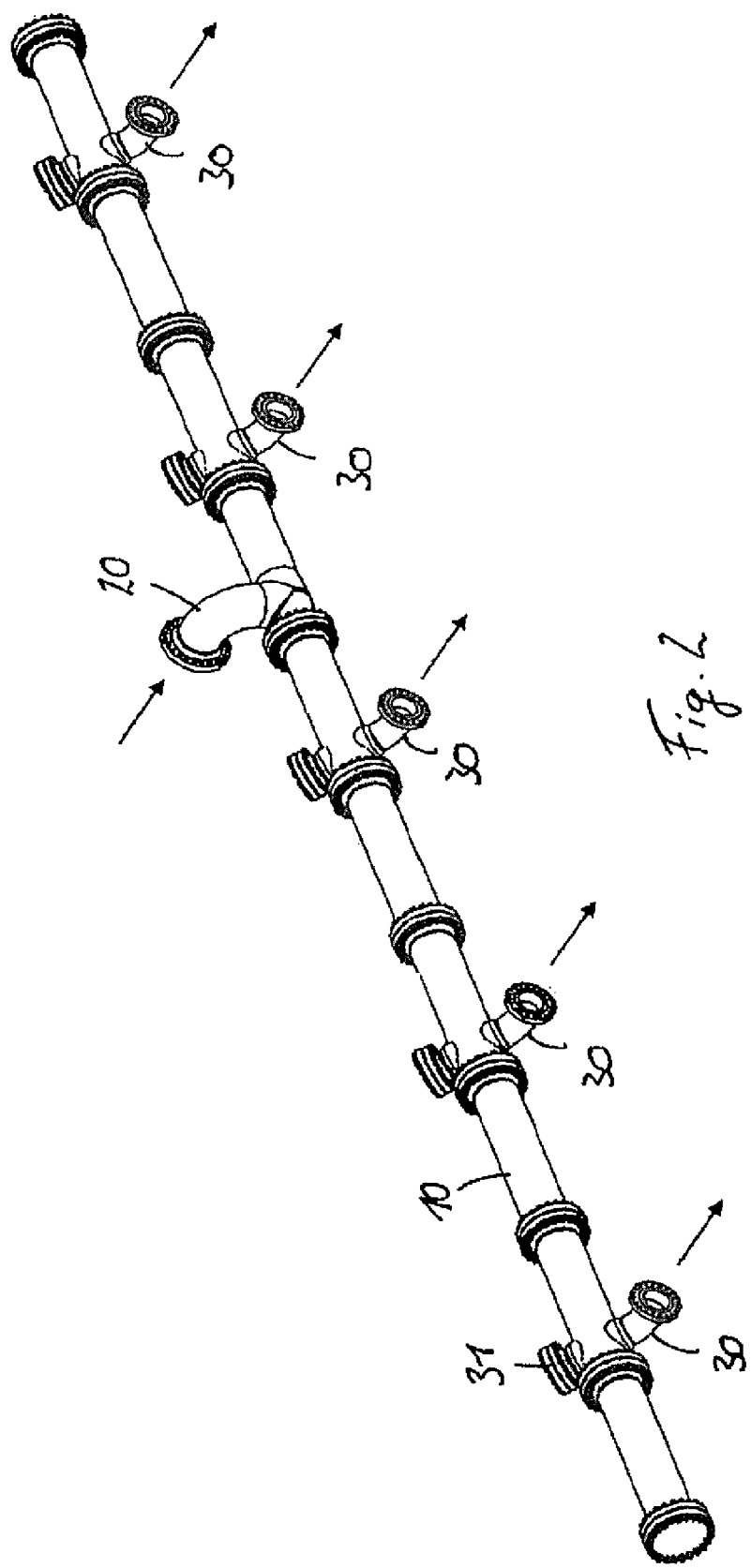
FIG. 2 shows an illustration of a tubular collecting container.

A collecting container 10 is shown in isolation in FIG. 2. The collecting container 10 is provided in the form of a tubular main body with an inlet 20, which is designed as a 90° connector in the illustrated exemplary embodiment, and with a plurality of outlet connectors 30, which lead to the multi-phase pumps. The collecting container 10 is constructed in a substantially modular manner and provides a tubular main body, at the ends of which screw flanges are provided. The outlet connectors 30 are arranged in the tubular body between the screw flanges, and each of said outlet connectors 30 is arranged opposite an access flange 31, via which an insert for example can be inserted and aligned in the outlet connector 30. The inlet 20 can either be welded or screwed to the inlet connector. The inlet 20 may be provided as a T-piece with screw flanges, so that it can be screwed between two pipe sections of the collecting body 10. Due to the screw design, practically any number of outlet connectors 30 can be connected in parallel to one another, and therefore a correspondingly large number of pumps can be connected to the collecting container 10. It is likewise possible to provide inlets 20 at various points, said inlets being easily screwed between two pipe sections.

The course of flow of the multi-phase mixture is suggested by the arrows: the upper arrow indicates the inlet of the multi-phase mixture through the inlet 20, and the lower arrows, which are assigned to the outlet connectors 30, indicate the fact that the divided multi-phase mixture is discharged through the outlet connector 30. In the illustrated exemplary embodiment, the outlet connectors 30 are oriented downwardly in an inclined manner and discharge at the lowest point of the collecting container 10, such that the entire liquid phase that has settled in the collecting container 10 can be easily transported away through the outlet connectors 30.

Figure 3:
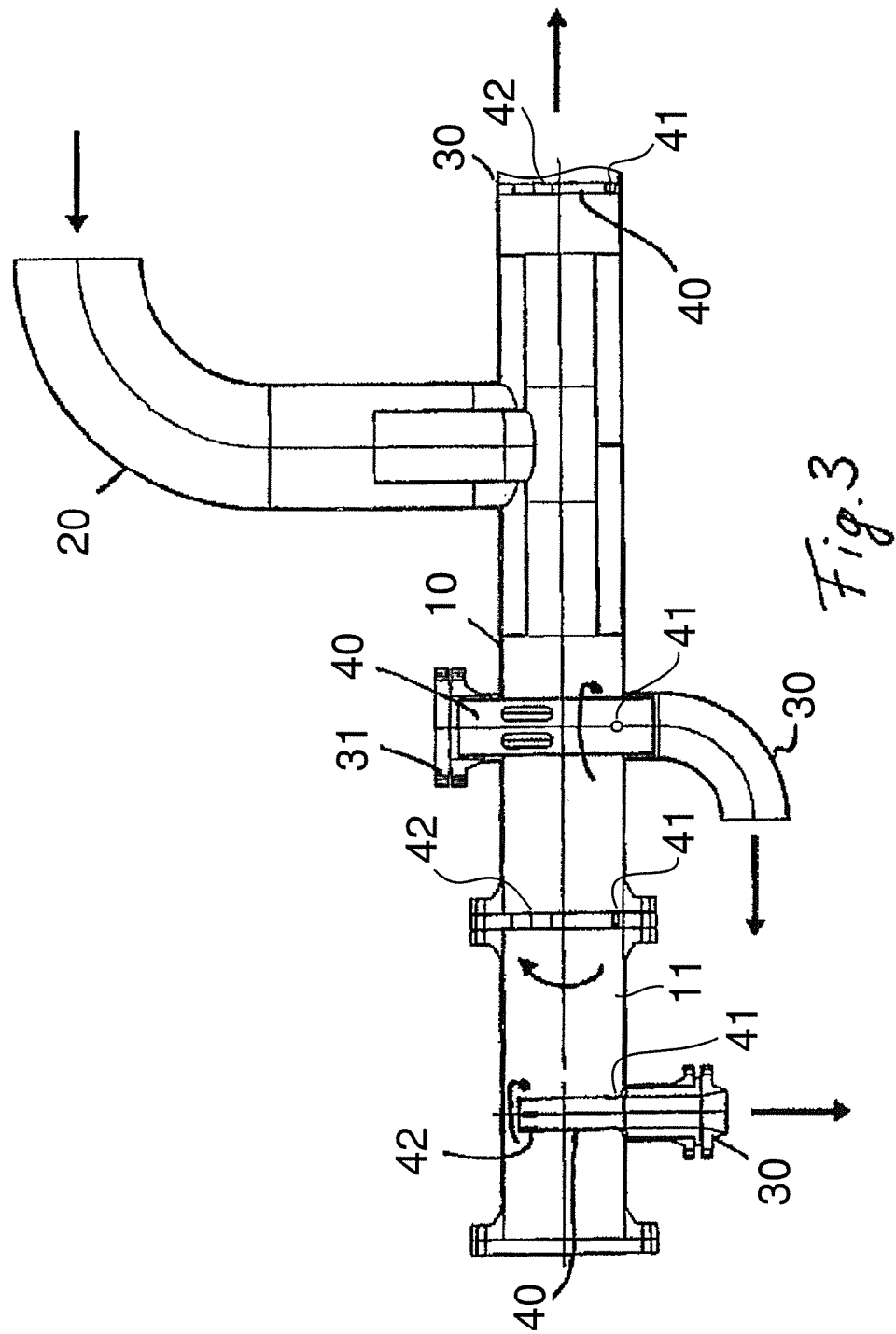
FIGS. 3 to 6 show sectional views of different collecting containers.

A variant of the embodiment of the collecting container 10 is illustrated in FIG. 3. The inlet 20 with the 90° inlet connector is rotated through 90°. The multi-phase mixture reaches the collecting container 10 via the inlet 20, as suggested by the arrow. Devices for influencing swirl may be provided in the inlet 20 so as to distribute the multi-phase mixture as uniformly as possible.

Internals 40, which are assigned to the outlet connector 30, are arranged within the collecting container 10, which is designed as a succession of pipe segments. An internal 40 that is a tubular insert is inserted into the outlet connector 30. The insert is arranged rotatably in the collecting container 10 and has a lower opening 41 and a plurality of upper openings 42, which each extend above the level of the collecting container base 11. The insert can be rotated via the access flange 31. The insert is arranged replaceably within the collecting container 10 so that the geometry can be varied as a result of replacement by another insert.

In FIG. 3, a further internal 40 in the form of a baffle plate is arranged to the left beside the first outlet connector 30. The baffle plate is fixed between two screw flanges of the pipe sections. In this case too, a lower opening 41 is provided, which has a smaller flow cross section than the upper opening 42. The baffle plate can be installed in different positions between the two pipe sections so as to set the level of the liquid sump between the baffle plate and the inlet 20.

In FIG. 3, a further outlet connector 30 is provided to the left beside the baffle plate and has an internal 40 that is a rotatable insert, which likewise has a lower opening 41 and a plurality of upper openings 42 with a larger diameter than the lower opening 41. The insert 40 can be rotated externally via the outlet connector 30 so that the position and, if necessary, the diametrical cross sections of the openings 41, 42 can be adjusted.

A further baffle plate, as an internal 40, is shown to the right beside the inlet 20 and has an upper opening 42 and a lower opening 41, which leads to an outlet connector 30. Due to the embodiment of the collecting container 10 according to FIG. 3, it is possible to store within the collecting container 10 a liquid sump, which at most reaches the height of the upper openings 42. Depending on the dimensioning of the lower openings 41 and the volume of the collecting element 10, it is ensured that only a small amount of liquid is removed through the outlet connectors 30 over a relatively long period, such that the pumps connecting to the outlet connectors 30, in particular screw-type multi-phase pumps, are always provided with a minimal amount of liquid by means of the material flow. This minimal amount of liquid seals the design-induced gaps between the delivery elements in the screw-type pumps. This seal is necessary so that the pumps can convey gas, which would otherwise flow unhindered through the gaps. Furthermore, the minimal liquid flow is used as a coolant to remove the compression heat, generated during the gas conveying process, from the pump.

Figure 4:
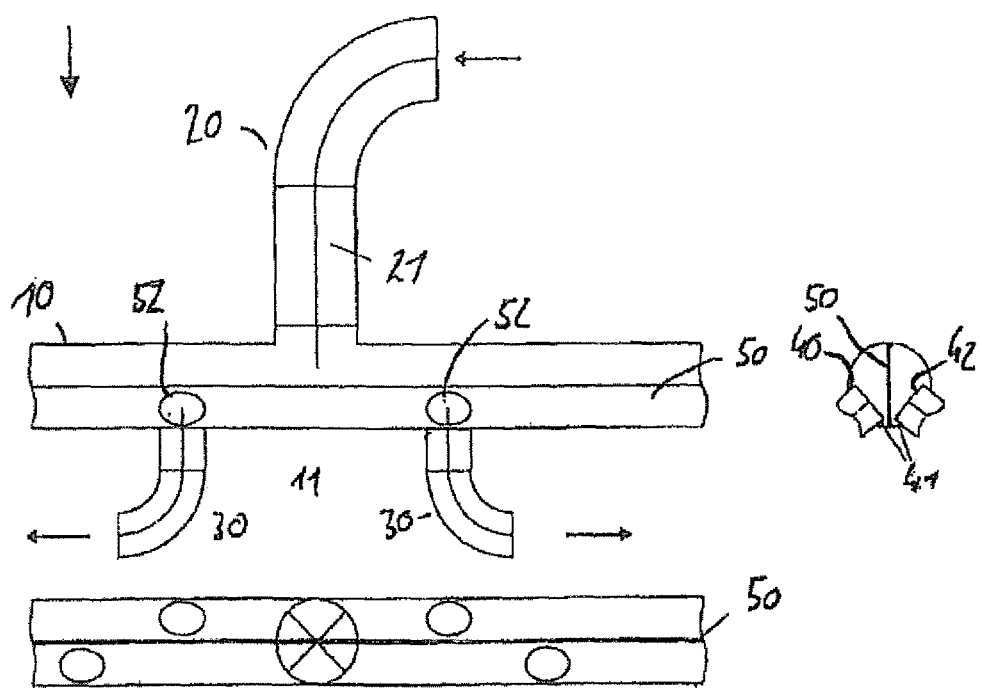

A variant of the invention is illustrated in FIG. 4. A vertically oriented partition plate 50 is arranged within the collecting container 10. A swirl influencing device 21 can be provided in the inlet 20. The vertical partition plate 50 is used for a first division of the multi-phase flow entering through the inlet 20. A first division of the multi-phase flow is thus undertaken to the right and left of the longitudinal extension. Outlet connectors 30 are arranged at the lower end of the collecting container 10 on either side of the partition plate 50 and each lead to a pump. Compensation windows 52 are provided within the partition plate 50 so as to enable overflow. The compensation windows 52 are arranged in the lower region of the partition plate so that predominantly liquid phase is exchanged between the two chambers of the collecting container. In the sectional illustration to the right in FIG. 4, it can be seen that connectors protruding in an inclined manner into the respective chambers are provided as internals 40, which have small bores 41 at their lower end, which is assigned to the collecting container base 11, the minimal liquid flow being supplied via said bores to the respective pumps. The upper opening 42 is formed by the diameter of the connector.

Figure 5:
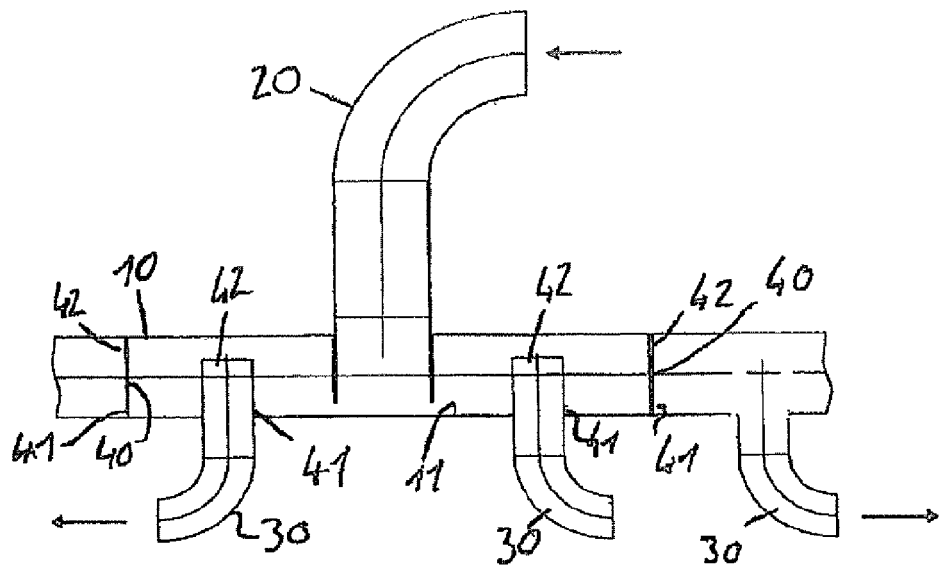

A further variant of the invention is shown in FIG. 5. The internals 40 on either side of the inlet 20 provide an upper opening 42 oriented vertically upwardly and a lower bore 41 arranged in the region of the collecting container base 11. Internals 40 that are baffle plates are arranged on either side beside the first outlet connector 30 and likewise have an upper opening 42 and a lower opening 41. A further outlet connector 30 is arranged to the right beside the right-hand baffle plate and leads to a further pump. The baffle plate is thus assigned to the outlet connector 30 arranged to the right and allows only a metered volume of the liquid phase to pass through the lower opening 41 and reach the right-hand outlet connector 30.

Figure 6:
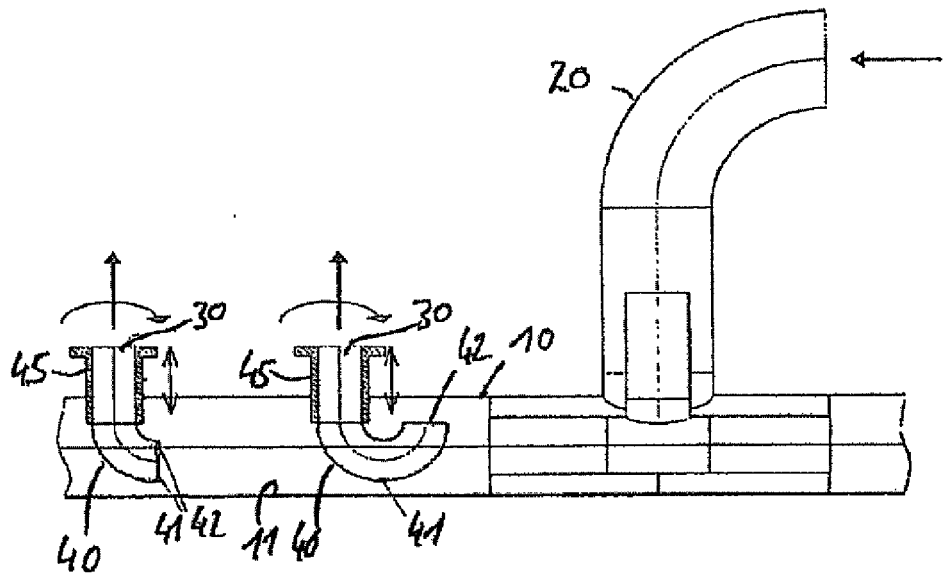

FIG. 6 shows a further variant of the invention, in which a plurality of outlet connectors 30 is provided. The outlet connectors 30 are oriented upwardly and are mounted rotatably on the collecting container 10. Due to the possibility for rotation, the height of each outlet connector can be adjusted by means of an integrated thread 45 formed on the outer surface of the connector 30. The height adjustment is suggested by the double-headed arrows. The left-hand outlet connector 30 has a 90° angle section as an internal part, and the inlet side is closed by a plate, which has a lower, small opening 41 and an upper, large opening 42. A sump within the collecting container 10 can also be formed as a result of such an embodiment. The further the internals 40 are moved downwards, the more of the liquid phase that has settled on the collecting container base 11 can be discharged.

The right-hand outlet connector 31 is likewise mounted on the collecting container 10 so as to be height-adjustable via a thread 45. A U-shaped connector is formed at the end on the side of the collecting container, and the underside of said connector has a small bore 41, which is oriented in the direction of the collecting container base 11. The larger opening 42 is formed by the open, upwardly directed cross section of the U-shaped pipe.

Figure 7:
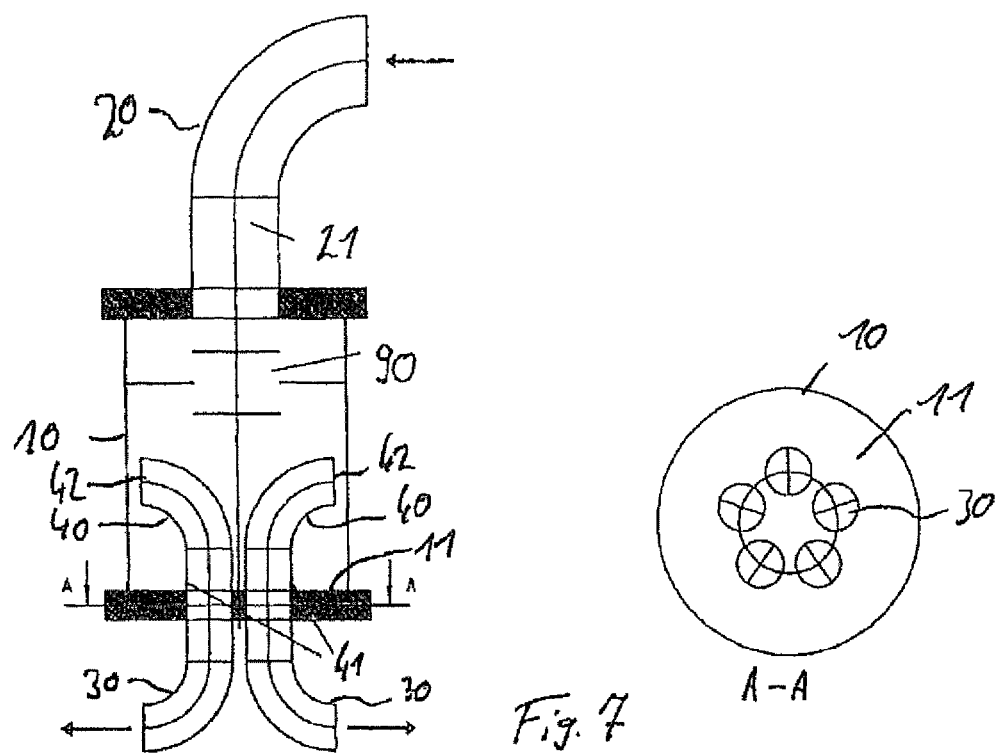
FIG. 7 shows a barrel-shaped collecting container.

A further variant of the invention is illustrated in FIG. 7. A column 90, which promotes separation of the liquid phase and the gas phase, is arranged after the inlet 20 comprising a device for influencing a swirl. The collecting container 10, which is formed in a barrel-shaped manner in this instance, has, at its base 11, five outlet connectors 30 for example, to which internals 40 in the form of curved pipes are connected. The upper opening 42 is oriented horizontally and in this case points toward the outer wall of the collecting container 10, although a different orientation of the upper opening 42 is, of course, possible. A lower opening 41 is arranged in the internals 40 in the region of the collecting container base 11.

Figure 8:
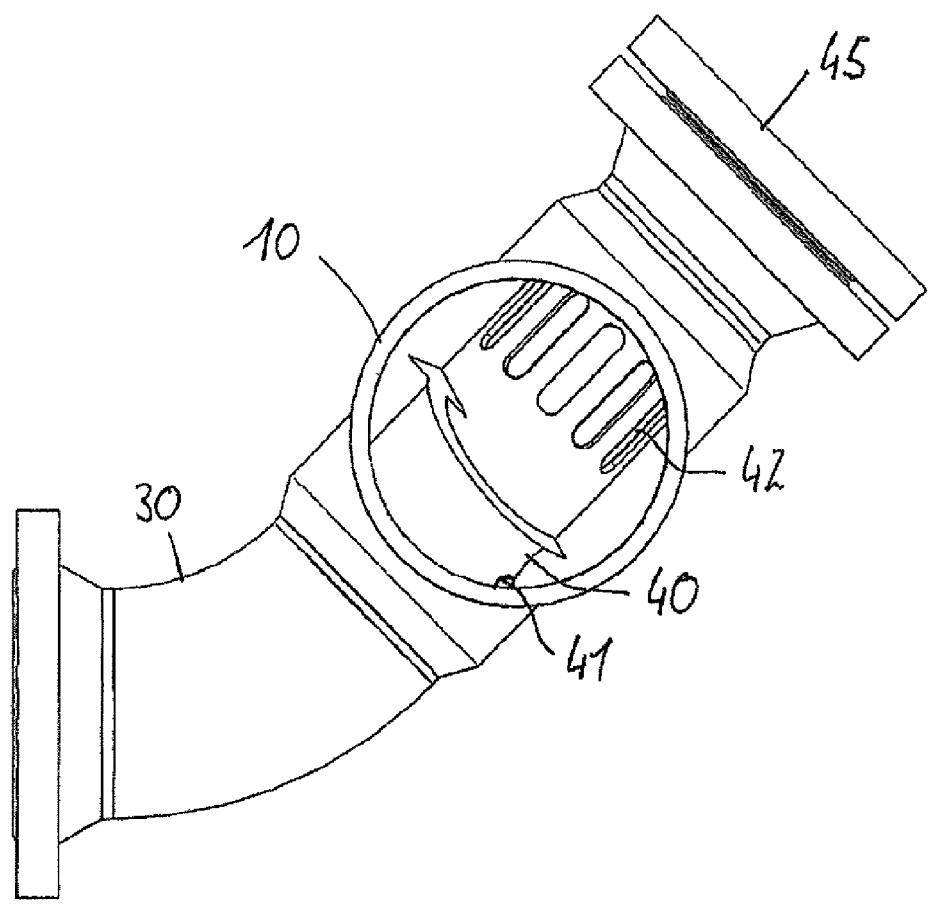
FIG. 8 shows a sectional illustration with an inclined outlet connector.

An inclined arrangement of the outlet connector 30 as well as the basket-like internal 40 are shown in FIG. 8. The upper openings 42 are designed as elongate slit-like holes, and a lower opening 41 is arranged in the region of the base of the tubular collecting container 10. Rotation can be implemented externally via an adjustment device 45 so that the orientation of the lower opening 41 can be varied.

Figure 9:
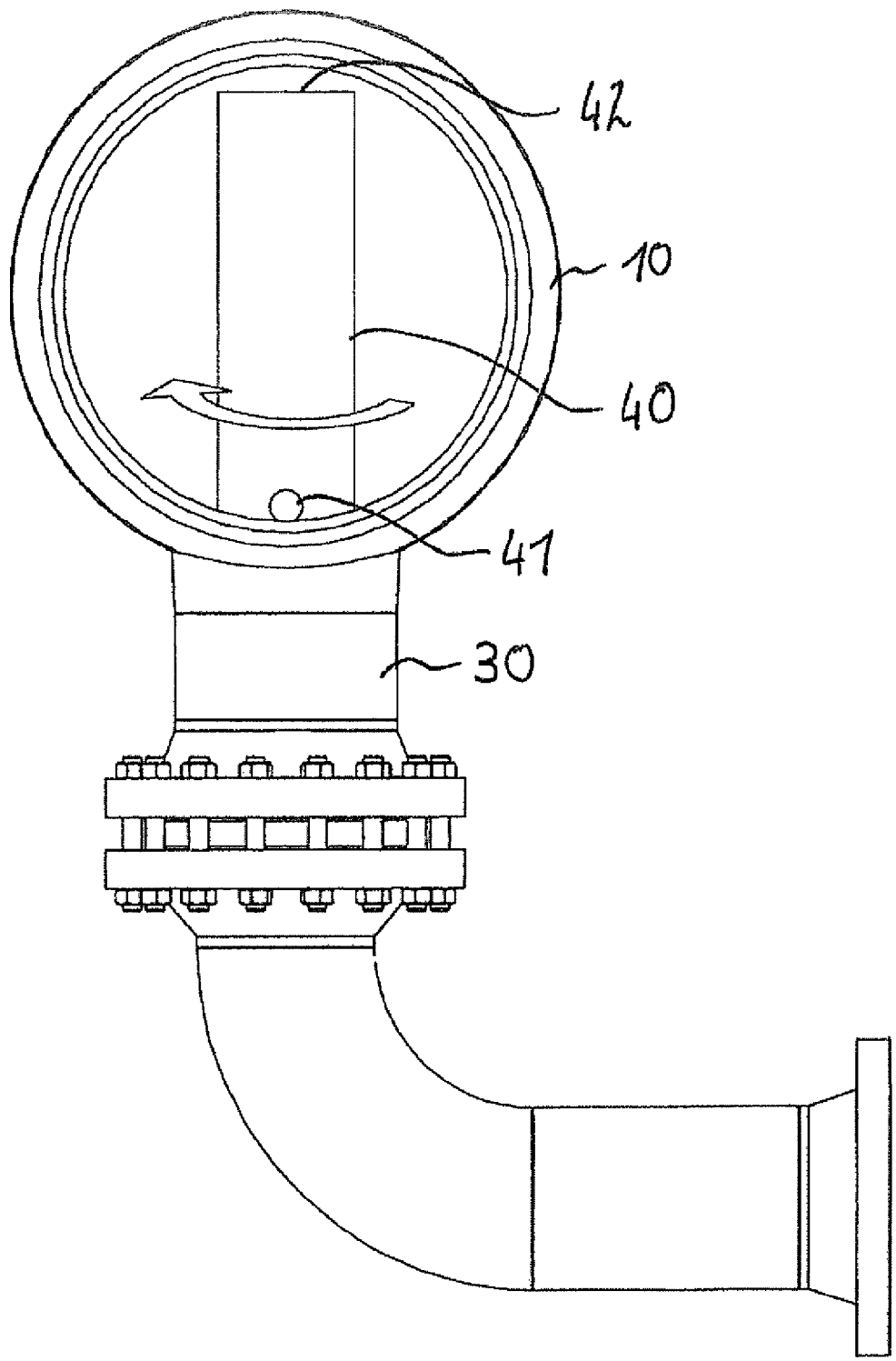
FIG. 9 shows a sectional illustration with a vertical outlet connector.

A variant of the invention with an outlet connector 30 oriented vertically downwardly is shown in FIG. 9. The internals 40 have a vertically upwardly oriented upper opening 42 and a lower opening 41 arranged at the bottom of the tubular collecting container 10. The internals 40 are also designed rotatably in this case so as to change the cross section of the lower opening depending on the position. In the illustrated position, the opening 41 is fully opened, wherein a rotation through 90° causes a maximum reduction of the flow cross section, until closure where necessary.

Figure 10:
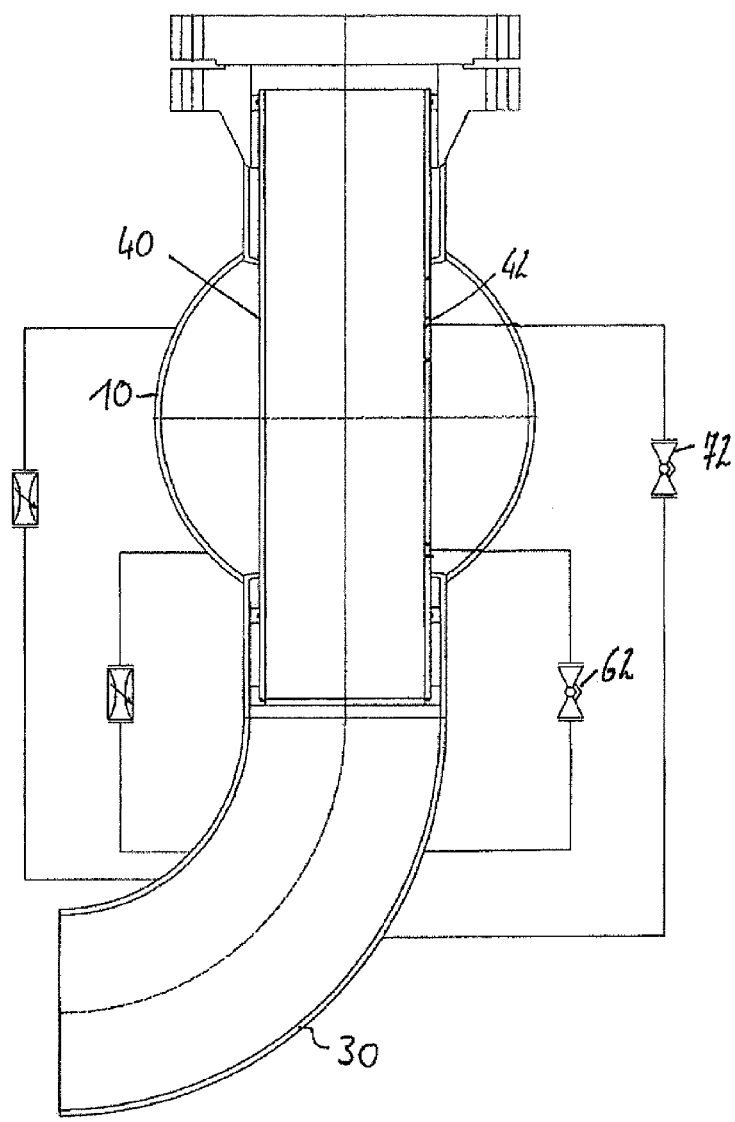
FIG. 10 shows a sectional illustration with valves.

FIG. 10 shows a schematic illustration of a further variant of the invention, in which an adjustable throttle 62 or an adjustable valve is assigned to the internals 40 at the lower openings 41; the same is true for the upper opening 42, wherein the adjustable valves or metering and closure devices 62, 72 are merely illustrated schematically. The metering and closure means 62, 72 are illustrated outside the collecting container 10 with lines in FIG. 10, merely for reasons of improved clarity, but in actual fact the openings 41, 42 with the metering or closure devices 62, 72 are provided in the internals 40 so that no lines are provided, but the product conveyed from the collecting container 10 instead enters the internals 40 through the openings 41, 42 and is transported away through the outlet connectors 30.

Figure 11:
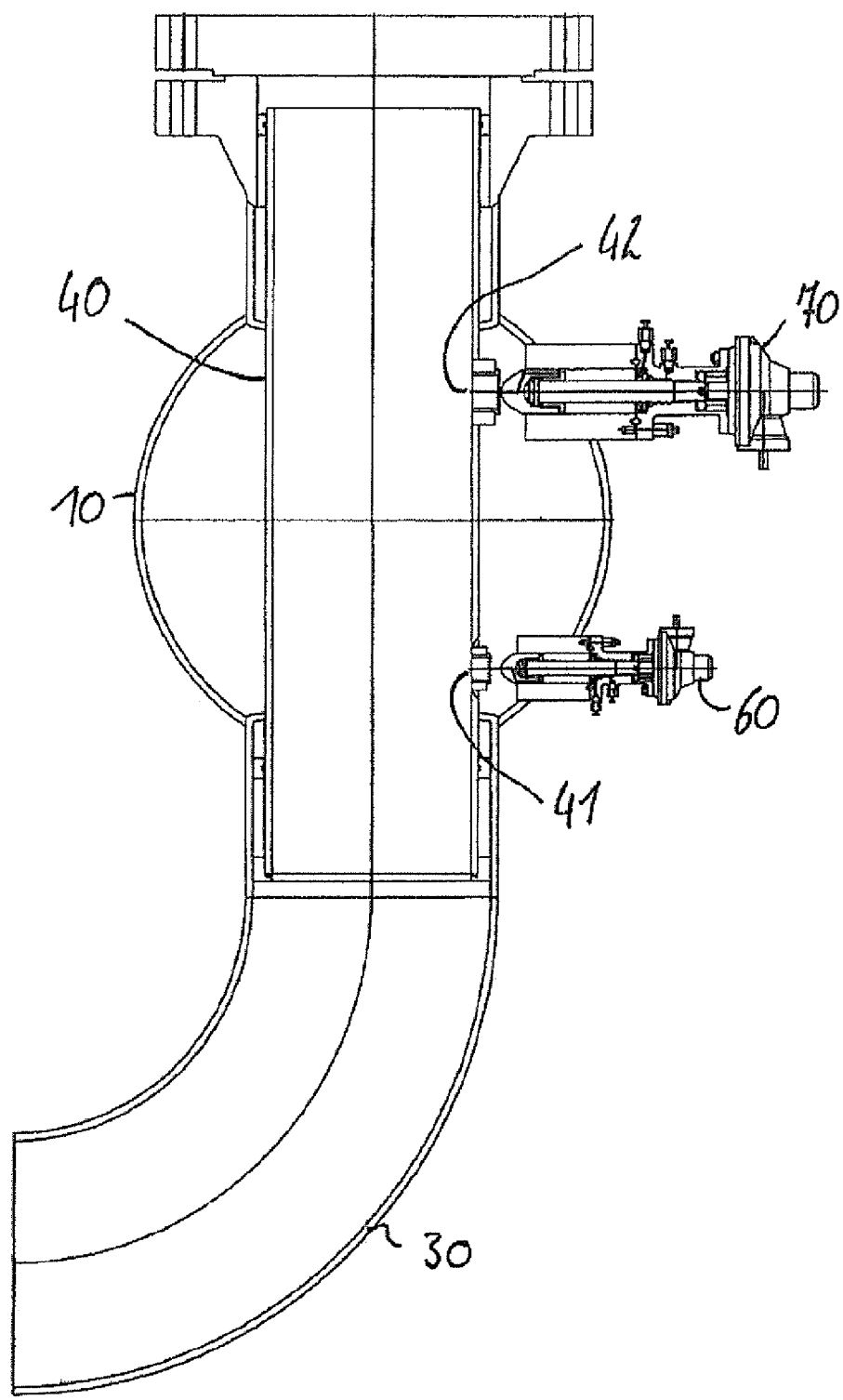
FIG. 11 shows a sectional illustration with closure and metering devices.

A constructive embodiment of the metering and closure devices 60, 70, which are assigned to the openings 42, 41, is shown in FIG. 11. The metering and closure devices 60, 70 are externally actuatable and, depending on the position of the metering and closure devices 60, 70, the respective opening 41, 42 can be closed in part or completely, for example so as to suppress the discharge of the product to be conveyed through the outlet connector 30. Servicing of the downstream pump is thus facilitated.

Figure 12:
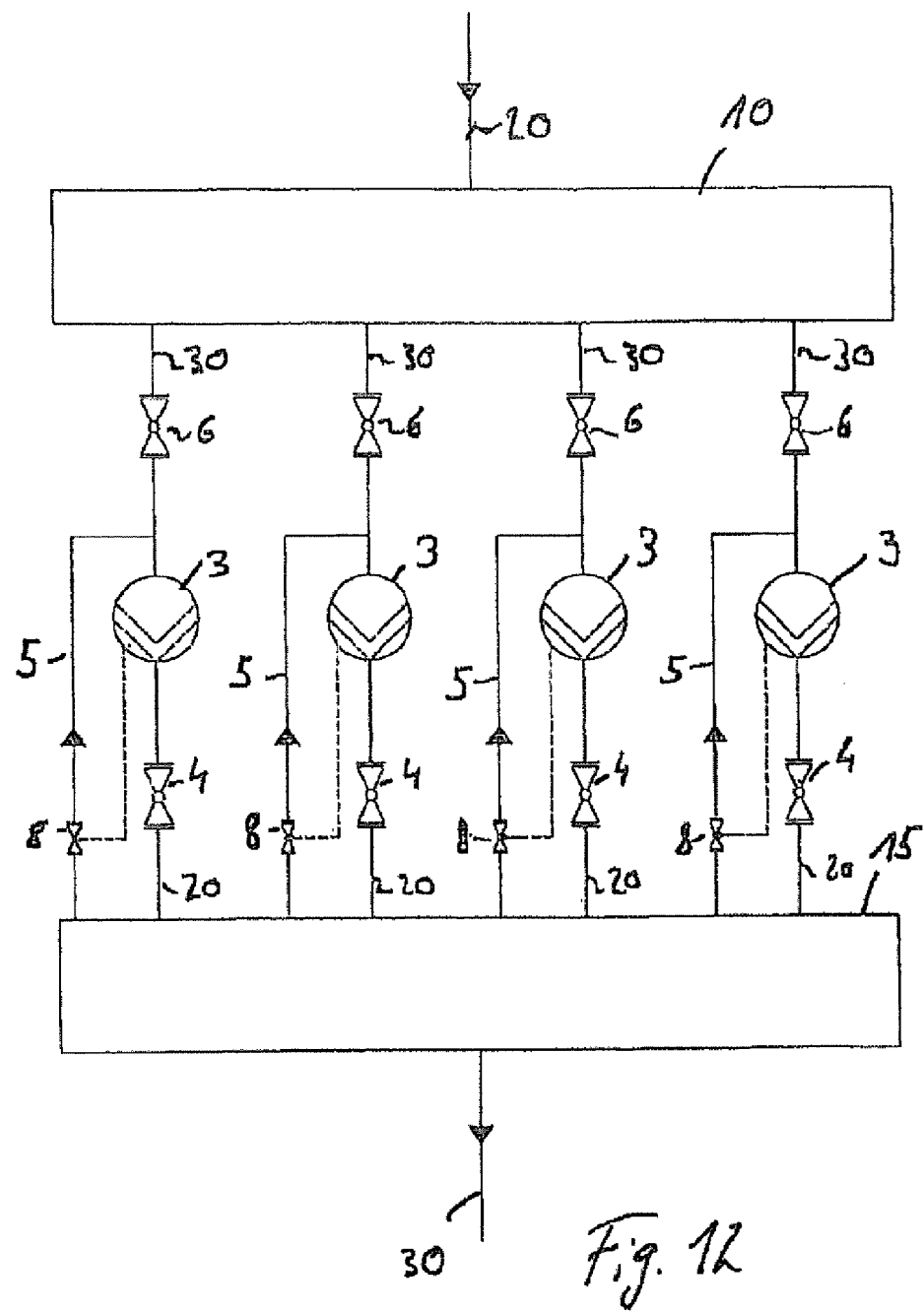
FIG. 12 shows a circuit diagram of an extraction facility.

FIG. 12 shows a schematic arrangement of a plurality of multi-phase pumps 3, which are connected in parallel between two collecting containers 10, 15. The first collecting container 10 has an inlet 20 and is provided with a total of four outlet connectors 30, the internals with the openings not being illustrated in the drawing, but being provided in the collecting container 10 nevertheless. The outlet connectors 30 are adjoined by valves 6, via which the flow rate through the lines, which are connected to the outlet connectors 30, can be changed. It is possible to close the lines completely. After the valves 6, the multi-phase pumps 3 are arranged, via which the multi-phase mixture is pumped from the collecting container 10. From the pumps 3, a line in which a further valve 4 is arranged leads to a second collecting container 15, which can also be referred to as an outlet collecting container. The outlet collecting container 15 may also have one or more internals, which have an upper and lower opening, as described above. A return line 5 equipped with a valve 8 leads from the outlet collecting container 15 to the inlet side of the respective pump 3, which leads to recirculation of separated liquid from the collecting container 15 to the inlet side of the respective multi-phase pump 3. The minimal amount of liquid required for the pumps 3, which are generally screw-type pumps, is thus provided such that a sufficient pressure can be built up and the compression heat can also be dissipated, even with large extracted quantities of gas and long-lasting extraction of the gas phase exclusively. An outlet connector 30 leads from the outlet collecting container 15 to a forwarding or further processing device.

The invention claimed is:

1. A collecting container for multi-phase mixtures from a hydrocarbon source, comprising:
   at least one inlet for introducing multi-phase mixtures into the collecting container;
   a plurality of outlet connectors which are connectable to pumps via which multi-phase mixtures are pumped; and
   inwardly directed internals which project upwardly beyond a base of the collecting container and have a first, upper opening and a second, lower opening, wherein the plurality of outlet connectors are each in fluid communication with at least one of the inwardly directed internals,
   wherein the inwardly directed internals are mounted displaceably and/or rotatably in the collecting container;
   wherein a flow cross section of the lower opening is smaller than that of the upper opening, and
   wherein the lower opening is assigned its own adjustable throttle or closure device.

2. The collecting container as claimed in claim 1, wherein the plurality of outlet connectors are oriented downwardly in an inclined manner or vertically downwardly.

3. The collecting container as claimed in claim 1, wherein the collecting container is a collecting pipe or collecting tank.

4. The collecting container as claimed in claim 1, wherein the upper opening in each of the inwardly directed internals is oriented vertically upwardly.

5. The collecting container as claimed in claim 1, wherein the inwardly directed internals are inserts, pipe sections, baffle plates, or deflector plates.

6. The collecting container as claimed in claim 1, wherein the inwardly directed internals are assigned adjustment devices, via which a free flow cross section of the upper and/or lower opening in the inwardly directed internals is capable of being varied from outside the collecting container.

7. The collecting container as claimed in claim 1, wherein the collecting container is formed in a closed manner.

8. The collecting container as claimed in claim 1, wherein closure or metering devices are arranged on one or more of the following: outlet connectors, outlet pipelines, and the inwardly directed internals.

9. The collecting container as claimed in claim 1, wherein separation devices are arranged in the collecting container and separate the gas phase from the liquid phase.

10. A system comprising
   at least one collecting container comprising:
      at least one inlet for introducing multi-phase mixtures into the collecting container;
      a plurality of outlet connectors which are connectable to pumps via which multi-phase mixtures are pumped; and
      inwardly directed internals which project upwardly beyond a base of the collecting container and have a first, upper opening and a second, lower opening, wherein the plurality of outlet connectors are each in fluid communication with at least one of the inwardly directed internals,
      wherein the inwardly directed internals are mounted displaceably and/or rotatably in the collecting container;
      wherein a flow cross section of the lower opening is smaller than that of the upper opening, and
      wherein the lower opening is assigned its own adjustable throttle or closure device; and
   a plurality of multi-phase pumps connected to the at least one collecting container.

11. The system as claimed in claim 10, wherein the plurality of multi-phase pumps includes at least one inlet multi-phase pump arranged on an inlet side of the at least one collecting container, and further comprising a line that leads from the collecting container to the inlet side of the at least one inlet multi-phase pump.

12. The system as claimed in claim 10, further comprising a control device which is coupled to sensors and adjustment devices arranged on the plurality of multi-phase pumps and adjusts a flow cross section of at least one opening on the basis of values from the sensors.

* * * * *